LOUIS BLENDERMANN

Sept. 30, 1969   L. BLENDERMANN   3,469,698
CONTROLLED FLOW DRAIN

Filed April 5, 1967   3 Sheets-Sheet 2

INVENTOR.
LOUIS BLENDERMANN
BY Ely & Golrick
ATTORNEYS

INVENTOR
LOUIS BLENDERMANN

United States Patent Office 3,469,698
Patented Sept. 30, 1969

3,469,698
CONTROLLED FLOW DRAIN
Louis Blendermann, North Palm Beach, Fla., assignor to Josam Manufacturing Co., a corporation of Delaware
Filed Apr. 5, 1967, Ser. No. 628,658
Int. Cl. E03f 5/06, 5/04
U.S. Cl. 210—163                                    21 Claims

ABSTRACT OF THE DISCLOSURE

A roof drain having a circumferential adjustable weir structure controlling the rate of flow of water through the drain from the surrounding drained area for heads of water up to the height of the weir; the weir structure being either automatically adjusting responsive to head by displacement of resilient elements deflecting to enlarge weir openings with increasing head, or presettably adjustable by relative displacement of telescoped slotted collars angularly or of elements radially or angularly to vary slots defined between adjacent plate edges.

---

The present invention relates generally to controlled flow drains and more particularly to a roof drain incorporating a weir structure.

In modern building design, so-called roof storage of rainfall to an increasing degree is relied upon and utilized in design to minimize rationally the number of drains and the capacity or size of drain leaders and drainage lines installed in the building, and also to control the actual rate of run-off to outside disposal facilities such as dry wells or more usually storm sewer or combined sanitary and storm sewer lines, especially where the building, as generally the case, is served by public sewers, to avoid overloading the sewers. By standard or acceptable roof design there is available a certain permitted loading by rainfall storage on the roof, rather generally taken as a 3 inch head of water for a flat roof. The drains used in such installations incorporate a flow control structure, generally a vertical weir with top edge located, for example, at three inches above the roof surface level, whereby there is available a flow or drainage opening into the drain body from the point at the roof level up to the top edge of the weir establishing the maximum roof water storage level. By such control at apertures or weirs, with heavy rainfall of such duration as would tend to load the sewer mains serving the building, the flow through such as drain is controlled to a certain desired range of flow, with any temporary excess under high intensity rainfall then being accumulated on the roof up to the permissible head established by the roof strength and design, corresponding to which then the top edge of the weir barrier is selected.

Though roof storage and roof storage type drains were proposed many decades ago, and drains in some degree suitable for such purpose have been available for some time, this type of building design and demand for drains especially suited thereto has become of particular importance in recent years, because of limitations reasonably imposed upon design by existing municipal sewage systems, by considerations of increased costs of construction, and further by the general awareness or inclination of architects to avail themselves of the advantages of roof storage.

By the present invention there is proposed use in a roof drain or the like vertically extended circumferential barrier arrangement in the drainage flow path with a slot or slots therein which are adjustable to determine an effective flow area. Nothing more than a simple vertical slot form may be used under one aspect of the invention. The adjacent edges of a closed series of baffle plates may define the slots, variable by angular or radial displacement of the plates; or concentrically fitted cylindrical or conical sleeves having respective slots which may be brought into a greater or lesser degree of alignment may be used, also resilient plate elements deflectable under water head may automatically provide a variable slot arrangement.

It is the general object of the present invention to provide a baffle or slotted barrier structure affording weir means in a controlled flow type drain improved from the viewpoint of performance or ease or cost of fabrication.

It is another object of the present invention to provide in a controlled flow drain a slotted barrier structure, wherein with a given drain the slots are easily adjustable in width to establish desired flow ranges. Other objects and advantages of the present invention will appear from the following description and the drawings wherein.

Figure 2:
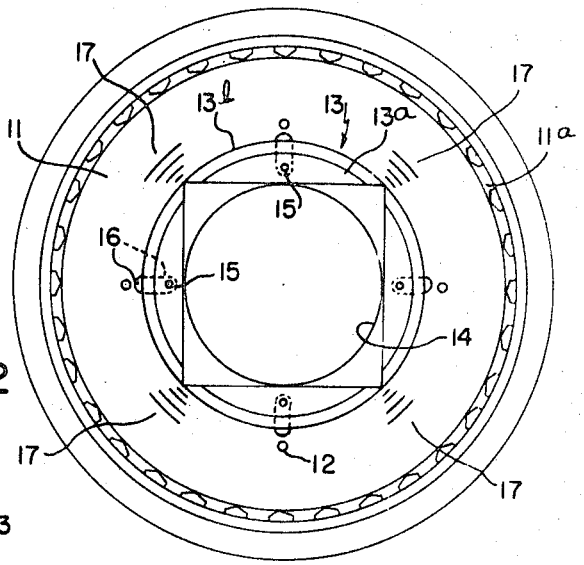
FIG. 2 is a fragmentary plan view showing primarily the FIG. 1 arrangement of the baffle elements, and also indicating the mode of flow of water therein.
Figure 4:
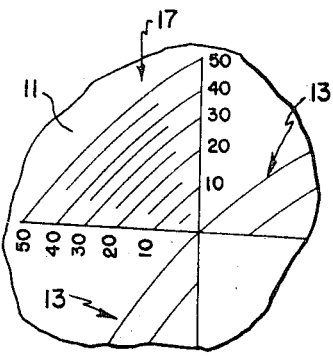
Figure 1:
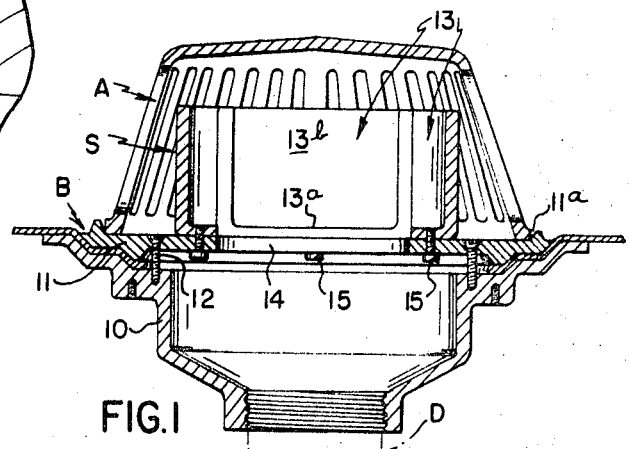
FIG. 1 is a vertical longitudinal axial section through one form of drain embodying the invention.
Figure 3A:
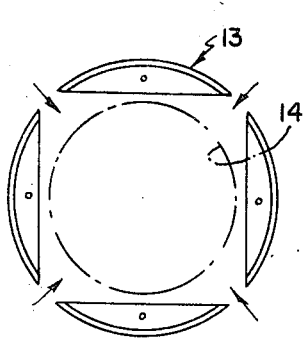
Figure 3B:
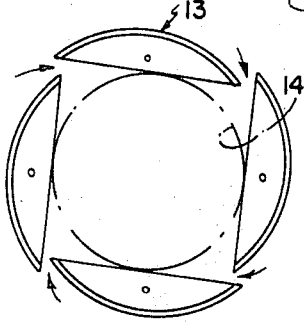
Figure 3C:
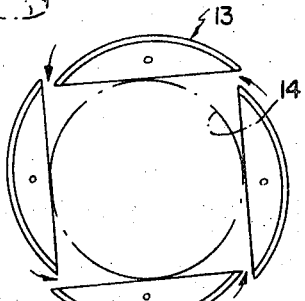
Figure 6:
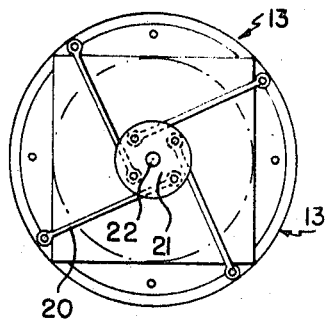
Figure 7:
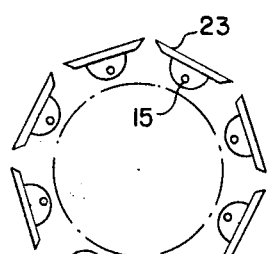
Figure 8:
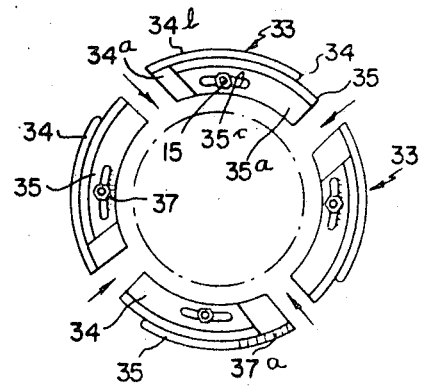
Figure 9:
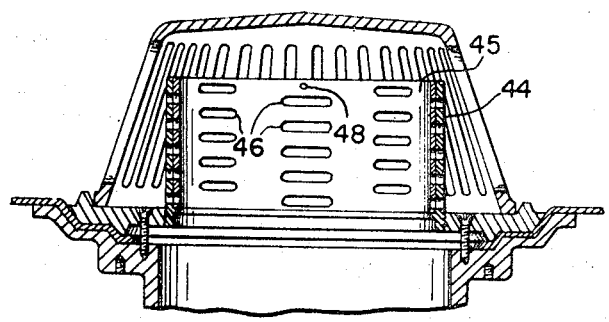
Figure 11:
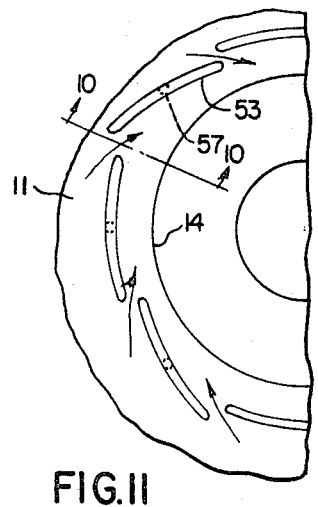
Figure 10:
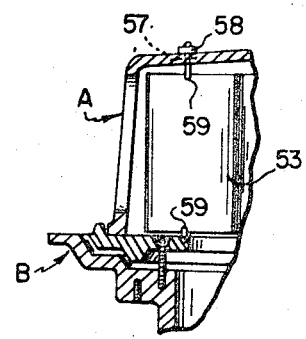
Figure 12:
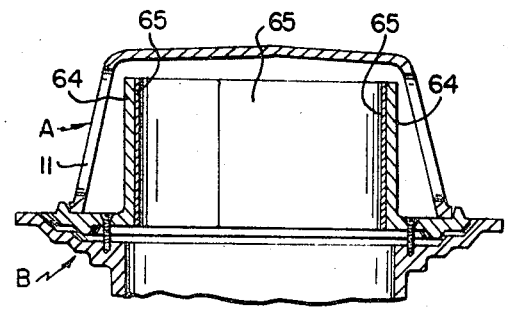
Figure 13:
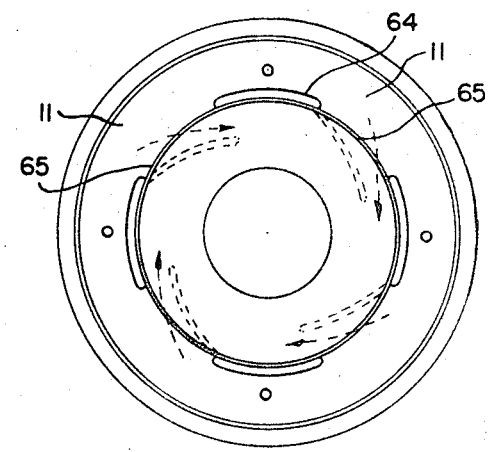
Figure 14:
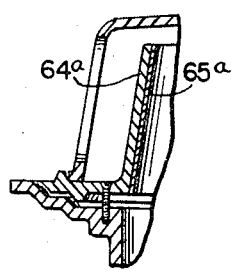
Figure 15:
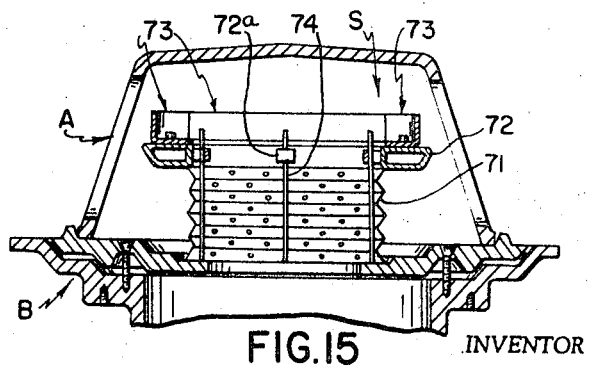

FIGS. 3A, 3B and 3C schematically show various settings of the drain of FIGS. 1–2;

FIG. 4 is a fragmentary detail of a calibrated scale for flow settings;

FIGS. 5A–5D illustrate various shapes of the weir slot defining edges of barrier elements;

FIG. 6 schematically represents a modification of the aforegoing structures;

FIG. 7 is a modification of the baffle structures using straight plates;

FIG. 8 schematically represents another modification, where slot adjustment is made by relative sliding of composite baffle parts relative to each other;

FIG. 9 is a modification analogous to FIG. 8;

FIGS. 10–11 are fragmentary views of another barrier structure modification;

FIGS. 12 and 13 are views similar to FIGS. 1 and 2 for drain modification automatically adjusting the weir sizes;

FIG. 14 is a fragmentary view representing a modification of the drain of FIGS. 12–13; and FIG. 15 is a vertical axial section through a still further modification as an automatically adjusting drain.

In FIGS. 1 and 2, the general drain arrangement wherein the invention is embodied is of a known type comprised of a two-piece drain body B, including a cast metal bowl-shaped main bottom part 10 with a bottom outlet in which is caulked, or as here shown, threadedly engaged, a vertical drainage leader of drain pipe D and a top annular metal plate part 11; and, for catching and retaining debris, a slotted type dome A having vertical and top slots affording a generous total flow area therethrough. Though these and other parts of the drain are represented or described as metal, plastics may be used in accordance with established design considerations.

Conventionally, the top surface of the integral flange portion 10a on the bowl 10 and the bottom of the plate 11 have cooperating formations adapted to clamp therebetween roofing or flashing material when the plate is secured to the bowl by a plurality of bolts 12; and the upper perimeter of the plate has integrally formed thereon a vertically slotted circumferential formation 11a serving as a gravel stop and also to locate the dome A with bottom rim received therein on the top plate. However, the top plate also serves to mount underneath the dome area a water flow control barrier structure indicated as a whole by the general reference character S provided in accordance with the invention to control the flow of water, from the surrounding drainage area served by the drain, through the drain.

In the barrier structure S, four like upright baffle elements 13 are pivotally and radially adjustably secured on the top of plate 11 in symmetric disposition about the central plate opening 14 by respective bolts 15 extending through radial plate slots 16 and threaded into a base flange part 13a, whereby the spacing between the adjacent edges of the arcuate upright baffle portions 13b of the elements 13, each shown as a segment of a cylindrical shell, may be adjusted to define selected weir openings therebetween, by various dispositions as exemplified in part by FIGS. 3A, 3B and 3C. Sets of numbered index marks may be formed on the top of plate 11 as calibrated scales 17 numbered for flow rates (see FIG. 4) cooperating with the edges of the elements 13 to facilitate adjustment thereof to desired flow settings.

The bolt and slot connections of the elements 13 on plate 11 allow the elements to be moved from the positions of FIGS. 1–2 symmetrically radially to increase the width of the weir slot openings formed therebetween, which promotes radial flow of water into the drain as indicated by the arrows in FIG. 3A. On the other hand, the elements 13 may be pivoted on the bolts 12 in innermost slot positions clockwise or counterclockwise as shown respectively in FIGS. 3B and 3C, promoting respectively a clockwise or counterclockwise spiraling approach of water to the barrier. The illustrated sharp or bevelled edges of the elements result in a scoop-like action as one edge is cocked outwardly beyond the adjacent edge of a pair in the settings according to FIGS. 3B, 3C.

Figure 5A:
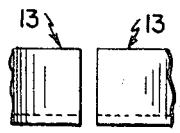
Figure 5B:
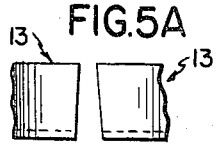
Figure 5C:
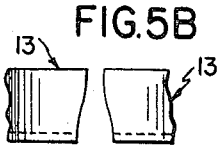
Figure 5D:
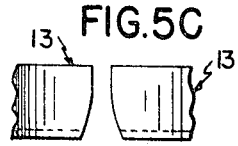

The slot-defining edges of the elements 13 and of corresponding elements in subsequently described forms may be straight and vertical as schematically indicated in FIG. 5A; or, especially where the elements 13 are shifted radially without pivoting, either straight but slanted, as in FIG. 5B, or contoured as in FIGS. 5C and 5D, the latter approximating a proportional weir.

Where merely angular adjustment and a simultaneous setting of the elements is desired to be available, the interconnection of FIG. 6 may be used wherein the elements 13 are secured to the body top plate by fixed pivots, and each has a corresponding end connected by pivot links or tie rods 20 to a common disc 21 rotatably supported by an upward stub shaft 22 projecting through and journalled in the top center of a structure above or spanning the barrier, such as the dome A to provide an operating means manipulatable from outside the drain, for example, by a wrench engaging a nut-like head on shaft 22, further bearing a pointer cooperating with a flow calibration scale mounted on the exterior of the dome top.

Weir slot width adjustment by merely pivoting elements appears in the barrier structure modification of schematic FIG. 7 where a series of like vertical plates 23 is mounted on the drain top plate symmetrically about its central opening, each secured by a clamping bolt 15 through its base flange about which it may pivot from the position shown to vary the weir slot width.

In FIG. 8 a radial flow modification of the barrier structure is shown wherein baffle assemblies 33, analogous to the prior elements 13, are each composite, being comprised of a pair of arcuately slideably nested elements 34 and 35 shaped generally similarly to the elements 13. The first element 34 has an arcuate upright wall portion 34b and integral arcuate bottom flange 34a secured on the drain top plate, and the second element 35 with arcuate wall 35b conformed to the interior of 34b has a bottom flange 35a provided with an arcuate slot 35c coaxial with the conformed arcuate faces of the vertical walls for a clamping bolt means 15 extending through flange 34a and the drain top plate. This movable part 35 may be extended or retracted by arcuate sliding relative to the associated fixed part 34, thereby to vary the slot defined between its extendable end edge and the adjacent edge of the fixed part of the next baffle assembly 33; and then clamped by bolt means 15 in position conveniently selected by use of a calibrated scale 37, conveniently located adjacent the bolt slot with the bolt as an indicator or at 37a on the top edge of 34 with the adjacent edge of 35 as an indicator.

A further modification employs telescoped sleeves 44, 45 one fixed on the top plate of the drain body and the other rotationally shiftable but securable relative thereto to vary the effective flow openings defined by the selected extent of coincidence of similar alignable slots in each; either elongated vertical slots, or as shown in FIG. 9 horizontally elongated slots 46. The slots 46 are similarly arranged in vertical sets and patterns on the two sleeves, with the vertical spacing of the slots in each set equal to the slot vertical widths; and the slots from one set to another vertically off-set by one slot width. Securing means 48 such as a set screw or a bolt-and-slot connection may be used to clamp the barrier sleeve member in position conveniently selected again by a calibrated scale and index mark, e.g., located on respective top edges of the sleeves.

In FIGS. 10–11 a series of simple like curved plates 53 with, however, vertical edges again bevelled, are each pivotally supported by a pivot pin or stud 57 projecting centrally from its top edge through a corresponding circular bore in a structure above or spanning the barrier, such as the top strainer dome A for securement by a locking nut 58 in angularly adjusted position determining the weir slots defined between successive plates. Preferably a bottom second pin 59 coaxial with the top pin is pivotally engaged in the drain body top plate for added support.

Whereas the baffle or plate elements in the aforegoing drain forms are secured at a selected adjusted position defining weir slots, the barrier structure may include elements movable under various heads of water on the surface drained, to automatically respond and change the effective weir slot sizes.

In FIGS. 12 and 13, the drain body top plate 11 is provided with equi-spaced arcuate upright fixed baffle plates 64, integrally cast therewith, for example, in effect portions of a broadly slotted cylindrical sleeve coaxial with the top plate opening, to the inner faces of which are secured by suitable means, as by riveting, bonding adhesively, etc., respective flexible movable curved baffle plates or leaves 65 each spanning a vertical slot between adjacent fixed plates and having a free end internally overlapping slightly the proximate vertical edge of an adjacent fixed plate, whereby under the pressure of drained water the leaves may flex inwardly (see dotted lines in FIG. 13) increasingly with increasing head to vary the weir slot widths in a configuration conducing to a clockwise vortex formation and flow into the drain; counterclockwise vortex and flow furthered, of course, by reversing the orientation of the free edges of the flexible plates relative to their respective fixed plates. For simplicity, instead of a single flexible leaf on each fixed plate, thus four in FIGS. 12–13, two longer leaves could be used in a single leaf on alternate plates, with opposite ends spanning the slots on each side, but with corresponding sacrifice of the vortex inducing action.

The movable plates 65 conveniently are formed of elastomer coated and protected spring steel selected for a spring rate to give the desired deflections, hence weir openings and flow rate up to the accepted maximum water storage height or head represented by the barrier height.

The fragmentary view of FIG. 14 discloses a truncated conical or tapered form of the overall barrier structure resulting when the arcuate fixed plates 64a and correspondingly shaped flexible leaves 65a are inclined toward the centerline of the drain. The flexible leaf arrangement of FIGS. 12–14 presently appears preferable to the alternative of securing each leaf across a slot to adjacent fixed plates at the top to swing inwardly with free end at the bottom.

Moreover, in a barrier structure having the general form of FIG. 1, the elements 13 may each be freely pivotally secured to plate 10, preferably near one end, but be biased toward minimum slot width position by spring means of suitable rate, as by a leaf spring fixed on either the top plate 11 or baffle element base 13a and bearing against the other, or a helical spring about the pivot pin with one end anchored and the other engaging the baffle element.

Quite another mode of automatic adjustability of the drain with head is afforded by the barrier structure of FIG. 15, wherein a perforated elastomeric bellows 71, coaxially disposed about the opening 12 of, and with bottom end sealed to, the drain top plate 11, has its top end sealed to the bottom of a baffle-carrying float ring 72, guided in its vertical excursions with differing water heads by radial vertically bored lugs 72a slideable on respective vertical guide rods 74 fixed in plate 11. The baffle elements 73 though of lesser height are similar to those of FIGS. 1 and 2 in shape and in angular adjustability to selected position on the float ring, for which simple clamping bolt means, rather than a bolt-and-slot, are sufficient.

The bellows is reinforced by wire rings molded in the ridges of its corrugations for shape maintenance as it extends or contracts with the float ring level changes. A multiplicity of preferably grommeted perforations of known size through the bellows is provided over the length and circumference to provide a definite discharge rate into the drain at various water heights; while the weir slots of the baffles provide greater adaptability of the drain to varying requirements of particular installations. The weight of the components may be selected relative to the float buoyancy effect so that the baffle slots are operative at all heads within the intended range of the drain, or only or primarily at the top position.

Preferably, the top plate 11 is modified from the form of FIGS. 1-2, by recessing about the central opening to accommodate the bellows and float ring in a lowermost position bringing the baffles down to the level of the surrounding roof level.

I claim:
1. A roof drain comprising:
   a body including a bowl-shaped portion having a top inlet and a lower outlet adapted to be connected to a drainage line;
   an open-top flow-barrier structure mounted on the body and surrounding and extending vertically from and above the level of said inlet;
   said barrier structure including adjustable means defining flow openings therethrough adjustable in size at all levels substantially to the top of the barrier structure to control the flow of water into the body for water levels on a drain-surrounding area up to the level of the barrier top.
2. A roof drain as described in claim 1, wherein said openings are adjustable to selected pre-set size, and including calibrated index means on the barrier structure to indicate the prevailing size of said openings.
3. A drain as described in claim 1, wherein said barrier structure is provided by first vertically extended means fixed on the said body and defining in effect a first hollow solid of revolution having open top and bottom ends and coaxially surrounding said inlet and having flow openings radially therethrough, providing flow areas therethrough at substantially all levels from the bottom to the top of the barrier structure, second vertically extended means mounted on the first said means and defining a similar second hollow solid of revolution coaxial with and in nesting relation with the first said solid, said second solid having flow openings therethrough similar to those of the first, said second means mounted on and in angularly coaxially shiftable relation to said first means to vary the extent of coincidence of the flow openings in said first and said second means whereby the total flow area through the barrier structure may be set.
4. A drain as described in claim 1, including a dome type grate supported on said body and surrounding said barrier structure.
5. A roof drain as described in claim 1 having an upper structure supported on the top of said drain body and spanning over said barrier structure;
   said barrier structure comprised of a plurality of like baffle plates with upper ends supported from the top of said upper structure by vertical pivots, said plates disposed in a closed pattern about said inlet with adjacent edges of successive baffle plates defining said openings;
   and means for releasably clamping said plates in selected positions relative to each other and to the said body for adjustment of the size of said openings.
6. A roof drain as described in claim 5 wherein each said baffle plate has a bottom pivot in vertical alignment with a respective said vertical pivot and engaged with the top of the drain body.
7. A roof drain as described in claim 1, wherein
   said barrier structure is comprised of a plurality of like-baffle elements each with a base portion pivotally mounted on the top of the drain body and an upwardly extending plate portion,
   said elements disposed in a closed pattern symmetrically about said inlet with the adjacent lateral edges of successive plate portions defining said flow openings;
   a shaft rotatably supported concentrically of the drain inlet;
   a plurality of connecting link rods each with one end pivotally eccentrically connected to said shaft and the other end connected to a respective baffle element eccentrially of its pivotal mounting,
   whereby rotation of said shaft simultaneously pivots said elements to adjust the flow openings;
   and means for releasably clamping said shaft to hold said elements in adjusted positions.
8. A roof drain as described in claim 7 including
   an upper structure spanning over said barrier structure;
   said shaft rotatably supported in a central bore through said upper structure;
   said clamping means operating to immobilize said shaft relative to said upper structure.
9. A roof drain as described in claim 1, wherein certain parts of said barrier structure are increasably displaceable relative to other parts under increasing water head, automatically to increase the size of said openings.
10. A roof drain as described in claim 9 wherein said barrier structure is provided by equi-spaced upwardly extending baffle plates fixed on the drain body and defining vertically extending slots therebetween, and a plurality of flexible leaves secured on the plates in overlapping relation internally of the plates, whereby under increasing head of water about the drain the leaves increasingly flex inwardly to increase flow openings defined between said plates and leaves.
11. A roof drain as described in claim 10, wherein each said flexible leaf comprises a spring metal plate covered with a protective elastomeric coating.
12. A roof drain as described in claim 10 wherein each said flexible leaf is secured only to one said fixed baffle plate to flex parallel inwardly away from a lateral edge of an adjacent baffle plate.
13. A roof drain as described in claim 10 wherein said fixed plates are in effect portions of a cylindrical shell.
14. A roof drain as described in claim 1 wherein
   said barrier structure is comprised of a plurality of vertical baffle elements disposed about said inlet with adjacent successive edge portions of said baffle elements defining said openings;
   said elements being releasably clamped in position relative to each other for adjustment of the size of said openings.

15. A roof drain as described in claim 14, wherein said baffle elements are concentrically arranged sleeves having like slot patterns therethrough, whereby rotational shifting of one sleeve relative to the other varies the degree of overlap of the slots to define correspondingly varied flow areas.

16. A roof drain as described in claim 14 wherein said baffle elements are provided by like baffle units disposed in a closed pattern about said inlet with adjacent edges of successive baffle units defining said openings;

said units being releasably clamped in position relative to the drain body for adjustment of the size of said openings.

17. A roof drain as described in claim 16, wherein each of said baffle units is a composite structure including a first vertically extended part and a second vertically extended part horizontally slideable in overlapped relation to vary the effective width of the unit and thereby of said openings defined between said units.

18. A roof drain as described in claim 16, wherein said baffle units each comprise a base portion releasably adjustably secured to the top of the drain body and an upwardly extending plate portion with lateral edges as the edges defining said openings.

19. A roof drain as described in claim 18, wherein each said unit is secured by clamping means providing radial shiftability of the unit toward and away from the drain inlet, and also pivoting angular shiftability about the clamping means, whereby the spacing of adjacent said lateral edges is varied to vary the size of said flow openings.

20. A roof drain as described in claim 18 wherein each said unit is secured by clamping pivot means to the top of the drain body providing angular shiftability whereby the spacing of adjacent said lateral edges is varied to vary the size of said flow openings.

21. A roof drain as described in claim 20 wherein said upwardly extending plate portion is externally convexly curved in transverse cross-section and has internal bevels on said lateral edges.

References Cited

UNITED STATES PATENTS

| | | | |
|---|---|---|---|
| 1,180,018 | 4/1916 | Degnan | 52—13 |
| 1,195,827 | 8/1916 | Lucke | 210—163 X |
| 1,681,394 | 8/1928 | Carlson | 210—163 X |
| 1,973,321 | 9/1934 | Schultz | 210—163 |
| 1,993,534 | 3/1935 | Stoltz | 210—164 X |
| 2,121,613 | 6/1938 | Schultz | 210—163 |
| 2,283,160 | 5/1942 | Bosey | 210—163 |
| 2,572,208 | 10/1951 | Sievert | 210—166 |
| 2,807,368 | 9/1957 | Blau | 52—12 X |
| 3,357,561 | 12/1967 | Schmid et al. | 52—12 |
| 2,697,840 | 12/1954 | Steele | 4—203 |
| 3,349,917 | 10/1967 | Strickland | 210—164 |
| 3,406,829 | 10/1968 | Bosche | 210—164 |

FOREIGN PATENTS

| | | |
|---|---|---|
| 675,691 | 5/1929 | France. |
| 933,703 | 8/1963 | Great Britain. |
| 976,590 | 11/1964 | Great Britain. |

REUBEN FRIEDMAN, Primary Examiner

T. A. GRANGER, Assistant Examiner

U.S. Cl. X.R.

52—12